(12) United States Patent
Oleson et al.

(10) Patent No.: US 9,315,271 B2
(45) Date of Patent: Apr. 19, 2016

(54) LEG RESTRAINT DEVICE FOR SIDE-FACING SEATED VEHICLE OCCUPANTS

(71) Applicant: B/E Aerospace, Inc., Wellington, FL (US)

(72) Inventors: Michael L. Oleson, Parkland, FL (US); Hau Ho, Pembroke Pines, FL (US); Dave L. Guyton, Pompano Beach, FL (US); Norman Shimizu, Pompano Beach, FL (US); Mark E. Deevey, Pompano Beach, FL (US); Pete C. Meister, Miami, FL (US); Michael J. Farvet, Wellington, FL (US)

(73) Assignees: B/E Aerospace, Inc., Wellington, FL (US); Takata Protection Systems Inc., Pompano Beach, FL (US)

( * ) Notice: Subject to any disclaimer, the term of this patent is extended or adjusted under 35 U.S.C. 154(b) by 0 days.

(21) Appl. No.: 14/628,431

(22) Filed: Feb. 23, 2015

(65) Prior Publication Data
US 2015/0166185 A1 Jun. 18, 2015

Related U.S. Application Data

(63) Continuation-in-part of application No. 14/519,996, filed on Oct. 21, 2014, now Pat. No. 9,139,114, which is a continuation of application No. 14/060,143, filed on Oct. 22, 2013, now Pat. No. 8,894,095, which is a continuation-in-part of application No. 13/907,079, filed on May 31, 2013, now Pat. No. 8,955,914.

(51) Int. Cl.
| | | |
|---|---|---|
| *B64D 11/06* | (2006.01) |
| *B60N 2/427* | (2006.01) |
| *B64D 25/04* | (2006.01) |
| *B60R 21/02* | (2006.01) |
| *B60N 2/42* | (2006.01) |
| *B60R 21/00* | (2006.01) |

(52) U.S. Cl.
CPC ............ *B64D 11/0619* (2014.12); *B60N 2/427* (2013.01); *B60N 2/4235* (2013.01); *B60N 2/42727* (2013.01); *B60R 21/02* (2013.01); *B64D 11/062* (2014.12); *B64D 25/04* (2013.01); *B60R 2021/0053* (2013.01); *B60R 2021/0093* (2013.01); *B60R 2021/0273* (2013.01)

(58) Field of Classification Search
CPC ........... B60N 2/4221; B60R 2021/022; B60R 21/23138; B60R 21/23184
See application file for complete search history.

(56) References Cited

U.S. PATENT DOCUMENTS

| | | |
|---|---|---|
| 2,859,803 A | 11/1958 | McCallister |
| 3,271,797 A | 9/1966 | Boyce |
| 3,287,064 A | 11/1966 | Freeman |

(Continued)

FOREIGN PATENT DOCUMENTS

WO 2013012890 A1 1/2013

*Primary Examiner* — Paul N Dickson
*Assistant Examiner* — Darlene P Condra
(74) *Attorney, Agent, or Firm* — Shumaker, Loop & Kendrick, LLP

(57) ABSTRACT

A lower leg restraint for a side-facing passenger seat including a restraint panel configured to deploy from a first position proximate a seat to a second position forward of the seat in response to an abrupt deceleration event, an actuator arranged to push the panel from the first position to the second position, and a sensor and trigger assembly configured to signal the actuator to fire in response to the abrupt deceleration event. A side-facing aircraft passenger seat having a deployable lower leg restraint.

15 Claims, 12 Drawing Sheets

(56) References Cited

U.S. PATENT DOCUMENTS

| | | | |
|---|---|---|---|
| 3,329,464 | A | 7/1967 | Barwood et al. |
| 3,424,408 | A | 1/1969 | Martin |
| 4,183,582 | A | 1/1980 | Taki |
| 4,198,075 | A * | 4/1980 | Kob ............... B60R 21/02 280/728.3 |
| 4,229,039 | A | 10/1980 | Day |
| 4,720,064 | A | 1/1988 | Herndon |
| 5,046,687 | A | 9/1991 | Herndon |
| 5,301,903 | A | 4/1994 | Aronne |
| 5,556,056 | A | 9/1996 | Kalberer et al. |
| 5,695,242 | A | 12/1997 | Brantman et al. |
| 6,217,059 | B1 | 4/2001 | Brown et al. |
| 7,118,180 | B1 | 10/2006 | Tanaka et al. |
| 7,198,288 | B2 | 4/2007 | Kim et al. |
| 7,857,087 | B2 * | 12/2010 | Matsuura ............... B60R 21/02 180/274 |
| 8,020,939 | B2 | 9/2011 | Stasiak et al. |
| 2003/0184061 | A1 | 10/2003 | Honda et al. |
| 2004/0026905 | A1 | 2/2004 | Kim et al. |
| 2005/0127654 | A1 | 6/2005 | Johansson et al. |
| 2010/0019477 | A1 * | 1/2010 | Korechika ............... B60R 21/02 280/748 |
| 2011/0012329 | A1 | 1/2011 | Sekino et al. |
| 2011/0043028 | A1 | 2/2011 | Basile |
| 2011/0272929 | A1 | 11/2011 | Fukawatase et al. |

\* cited by examiner

LEG RESTRAINT DEVICE FOR SIDE-FACING SEATED VEHICLE OCCUPANTS

CROSS-REFERENCE TO RELATED PATENT APPLICATIONS

This continuation-in-part application claims priority from U.S. patent application Ser. No. 14/519,996 filed Oct. 21, 2014, which is a continuation application claiming priority from U.S. patent application Ser. No. 14/060,143, filed Oct. 22, 2013, which is a continuation-in-part application claiming priority from U.S. patent application Ser. No. 13/907,079, filed May 31, 2013, the entirety of each of which is incorporated by reference herein.

TECHNICAL FIELD AND BACKGROUND OF THE INVENTION

The present invention relates to a leg restraint device for side-seated vehicle occupants. In particular, the invention relates to a leg restraint device for a side-seated occupant of, for example, corporate aircraft of the type offering side-facing seats for passengers. The disclosed invention has application in any form of vehicle transportation where passenger or occupant seats may be mounted in a side-facing orientation in relation to the direction of forward travel of the vehicle, such as an aircraft. The FAA has released Policy PS-ANM-25-03-R1 requiring leg flail prevention for occupants seated in side-facing seats when the occupant's upper leg is restricted by contact with the seat itself and/or with an interior component. In order to provide adequate occupant protection, the lower legs must also be restricted in a similar manner to avoid upper leg femur bone torsion. Thus, there is a need for a device that will provide this lower leg support during a dynamic event such as a crash.

Violent or abrupt deceleration can cause high g-force lateral loading on a side-facing passenger, causing lateral leg movement and leg rotation about the knee and femur. This can cause dislocations, muscle and tendon injuries and fractures due to the restraint exerted on the passengers' torso by seat belts and/or arm rests while the legs are unrestrained. However, belts or similar restraints on the legs are not advisable due to the additional time needed to remove the restraints, as well as the possibility that injuries to the passenger may make it difficult for either the passenger or emergency personnel to remove such restraints.

Therefore, there is a need for a type of leg restraint that provides protection to the legs of side-facing seat occupants in the event of a crash or other rapid deceleration, while not inhibiting rapid egress from the seat after the event.

SUMMARY OF THE INVENTION

It is therefore an object of the present invention to provide a leg restraint that provides protection to the legs of side-facing seat occupants in the event of a crash or other rapid deceleration.

It is another object of the invention to provide a leg restraint device that provides protection to the legs of side-facing seat occupants in the event of a crash or other rapid deceleration, while not inhibiting rapid egress from the seat after the event.

It is another object of the invention to provide a leg restraint device that provides protection to the lower legs of side-facing seat occupants in the event of a crash or other rapid deceleration, but that need not be deployed during taxi, take-off and landing ("TTOL").

It is another object of the invention to provide a leg restraint assembly including an actuator for automatically deploying a restraint panel to protect the lower legs of a seated passenger in the event of rapid deceleration, such as during a crash.

It is another object of the invention to provide a leg restraint assembly including cushioning material for preventing direct contact with rigid members of the assembly.

It is another object of the invention to provide a leg restraint that includes an actuator configured to automatically deploy outwardly from the seat a linear restraint panel that acts to restrict lateral movement of the lower leg, whereupon the linear restraint cushions and restricts lateral movement of the lower legs of a side-facing seat occupant during an abrupt deceleration event.

These and other objects and advantages of the invention are achieved by providing a leg restraint for side-seated vehicle occupants, and including a leg-restraining member adapted for being mounted in proximity to a side-facing vehicle seat and selectively moveable between a deployed, outwardly-extending leg-protecting position and a retracted, non-leg interfering position, and an actuator positioned operatively proximate the leg-restraining member and responsive to a signal output by a sensor for deploying the leg-restraining member upon the occurrence of an abrupt deceleration of the vehicle sensed by the sensor. The leg-restraining member may be in the form of a mechanical panel assembly, which may or may not be cushioned.

In another embodiment, a lower leg restraint for a side-facing passenger seat is provided herein including a restraint panel configured to deploy from a first position proximate a seat to a second position forward of the seat in response to an abrupt deceleration event, an actuator arranged to push the panel from the first position to the second position, and a sensor and trigger assembly configured to signal the actuator to fire in response to the abrupt deceleration event.

According to another embodiment, the actuator may be a pusher including a piston configured to rapidly extend by activation of a micro gas generator generating a volume of gas instantaneously by a rapid ignition of chemicals.

According to another embodiment, the restraint panel may be attached to a sliding carriage having one end thereof arranged facing the piston such that piston extension pushes the carriage away from the pusher in a direction of the second position.

According to another embodiment, the pusher may be attached to one face of a fixed mounting plate further supporting at least one horizontally-oriented bearing spaced from the pusher for guiding linear movement of the sliding carriage, the restraint panel translating relative to the fixed mounting plate as the restraint panel moves between the first and second positions.

According to another embodiment, the restraint may include a return spring arranged to return the restraint panel to the first position after the abrupt deceleration event, one end of the return spring attached to a fixed member and an opposite end of the return spring attached to one of the sliding carriage and the restraint panel.

According to another embodiment, the restraint panel may deploy from within a housing adapted to be positioned under the seat.

According to another embodiment, the restraint panel may deploy horizontally.

According to another embodiment, the restraint may include a cushion attached to an inboard face of the restraint panel.

According to another embodiment, the restraint panel may have a corrugated profile and a vertical dimension spanning between a floor supporting the seat and a seat pan of the seat.

According to another embodiment, the restraint may include a decorative end plate attached to a forward end of the restraint panel.

In another embodiment, a side-facing aircraft passenger seat having a deployable lower leg restraint is provided herein and includes a seat pan, a seat back, a restraint panel configured to deploy from a first position under the seat pan to a second position forward of the seat pan in response to an abrupt deceleration event, an actuator arranged to push the panel from the first position to the second position, and a sensor and trigger assembly configured to signal the actuator to fire in response to the abrupt deceleration event.

According to another embodiment, the actuator may be a pusher including a piston configured to rapidly extend by activation of a micro gas generator generating a volume of gas instantaneously by a rapid ignition of chemicals.

According to another embodiment, the restraint panel may be attached to a sliding carriage having one end thereof arranged facing the piston such that piston extension pushes the carriage away from the pusher in a direction of the second position.

According to another embodiment, the pusher may be attached to one face of a fixed mounting plate further supporting at least one horizontally-oriented bearing spaced from the pusher for guiding linear movement of the sliding carriage, the restraint panel translating relative to the fixed mounting plate as the restraint panel moves between the first and second positions.

According to another embodiment, the restraint panel may deploy horizontally from within a housing positioned below the seat pan.

Embodiments of the invention can include one or more or any combination of the above features and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWING FIGURES

The present invention is best understood when the following detailed description of the invention is read with reference to the accompanying drawings, in which.

DETAILED DESCRIPTION OF THE PREFERRED EMBODIMENT

Figure 1:
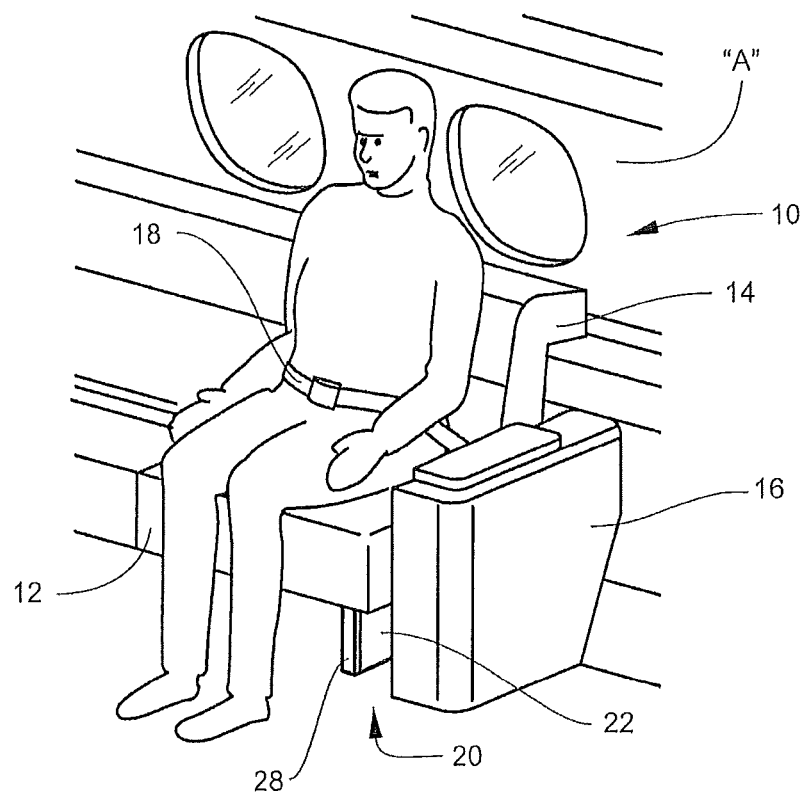
FIG. 1 is a perspective view of a side-seated aircraft seat, showing a leg restraint device according to a preferred embodiment of the invention in its retracted position.

Referring now specifically to the drawings, the environment of the disclosure is an aircraft of the type having side-facing seats, such as seat 10, having a seat bottom 12, seat back 14 and an armrest/end bay 16. Accordingly, a seat occupant sits with his or her back to the aircraft fuselage "A", facing outward in a generally perpendicular direction in relation to the longitudinal dimension of the aircraft and its direction of forward travel. For this reason, the occupant is subject to substantial lateral g-force loading along the longitudinal axis of the aircraft in the event of an abrupt deceleration such as might result during hard braking or a forward-directed crash event. While the upper torso and the thigh area of the legs are restrained to some extent by the armrest 16 and the seat belt 18, the lower legs are free to be projected laterally forward in the traveling direction, rotating violently around an axis defined by the knees, causing potential serious injury to both the knees and lower legs unless they are restrained in some manner. Injury to the legs is a particularly serious concern since such injuries could prevent a passenger from being able to egress unaided from the aircraft in the event of an accident.

Figure 2:
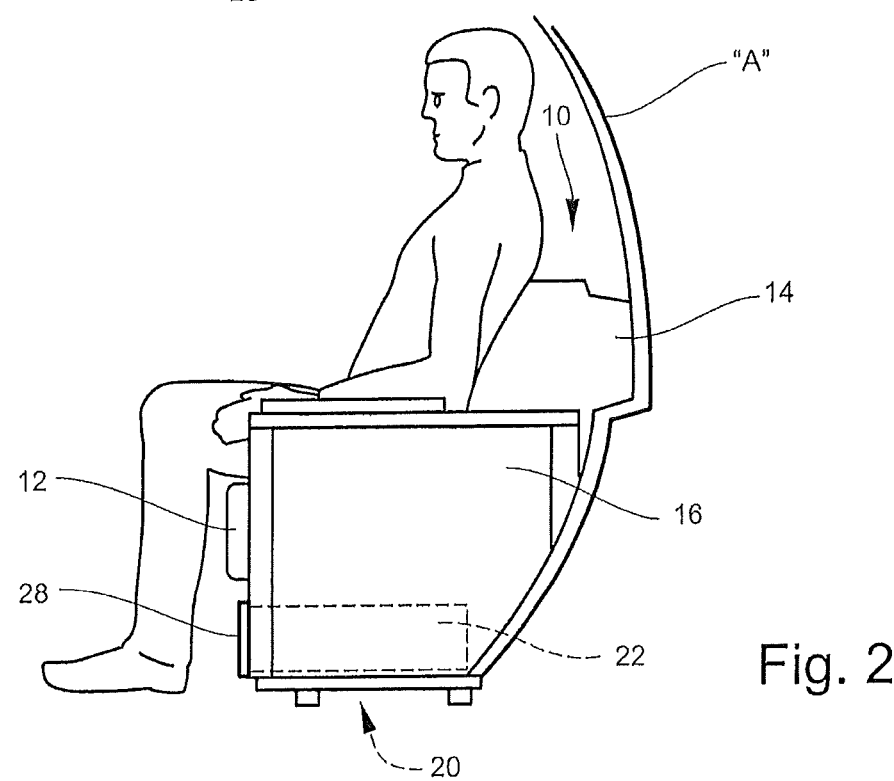
FIG. 2 is a side elevation of a side-seated aircraft seat, showing a leg restraint device according to a preferred embodiment of the invention in its retracted position.

Thus, in accordance with the invention, a leg restraint device 20 is provided. As shown in FIGS. 1 and 2, the leg restraint device 20 is mounted under the seat 10 on the forward side of the occupant in relation to the aircraft's direction of forward travel. The leg restraint device 20 generally includes a housing 22 mounted under the seat bottom 12 housing a deployable restraint panel 24 capped on a forward end with a cap plate 28, such as a decorative cap plate. During boarding, deplaning and normal flight, the leg restraint device 20 remains in a retracted position stowed within the housing 22, as shown in FIGS. 1 and 2. In the event of an abrupt deceleration, the restraint panel 24 is configured to automatically deploy to protect the lower legs, as described below in detail.

The leg restraint device 20 as shown in the Figures is a "left-hand" oriented device shown mounted under a seat 10 position along the left-hand side of the aircraft fuselage "A", from the position of the seat occupant. A right-handed device constructed in accordance with the invention would be utilized on seats facing inward from the right-hand side of the aircraft fuselage "A." In general, the left and right-hand versions may be mirror constructions of each other. A seat 10 may include both left-hand and right-hand restraints to accommodate deceleration events in either direction.

Figure 3:
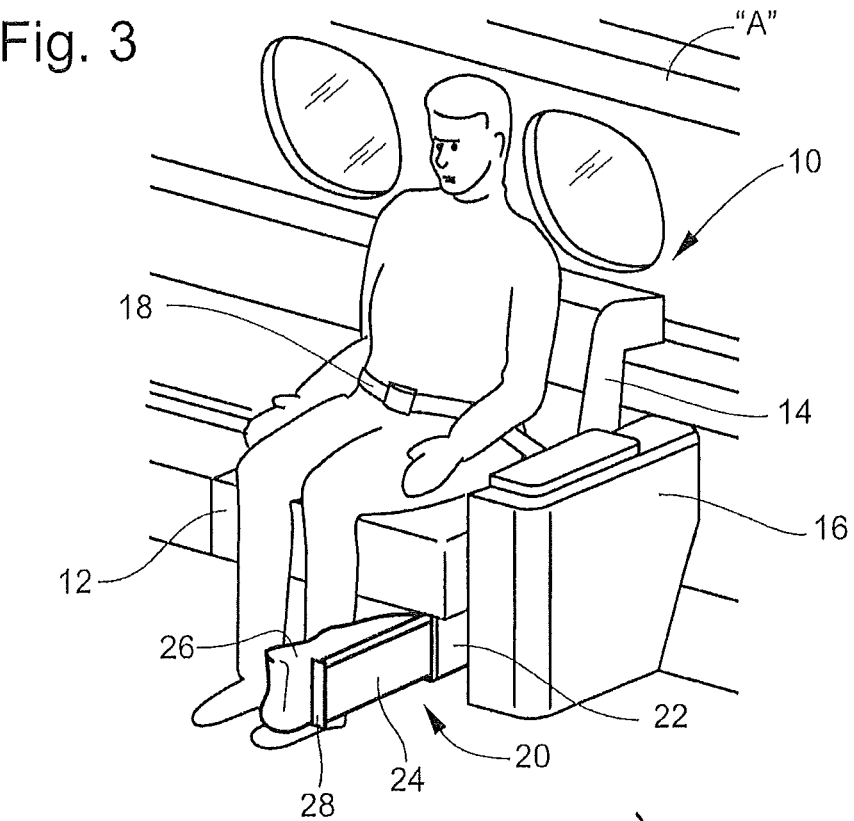
FIG. 3 is a perspective view of a side-seated aircraft seat, showing a leg restraint device according to a preferred embodiment of the invention in its deployed position.
Figure 4:
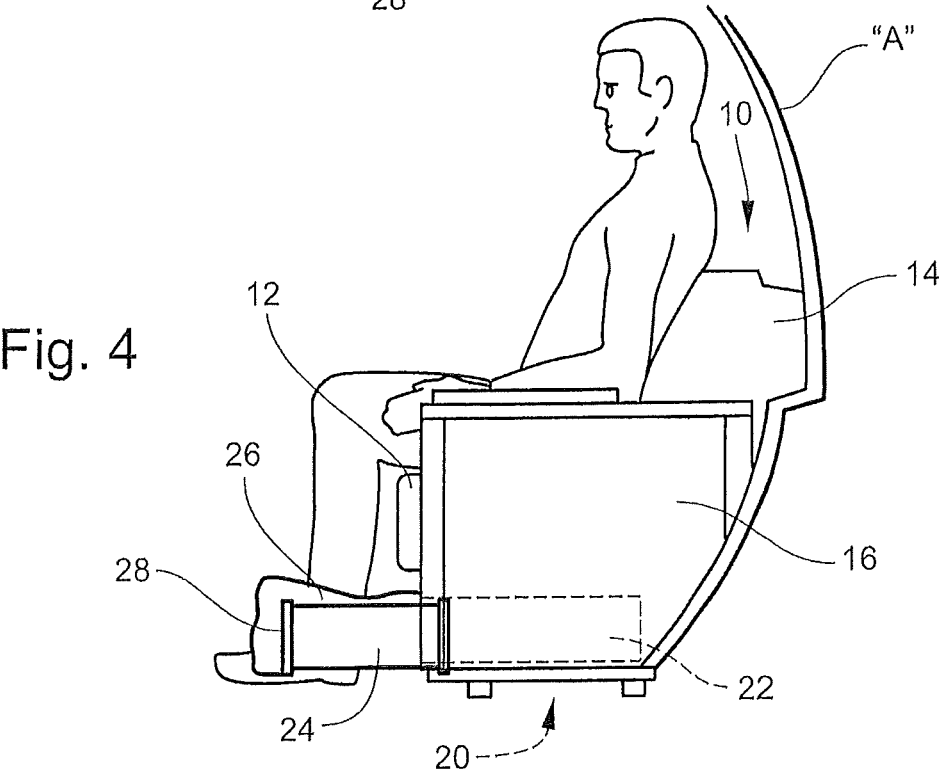
FIG. 4 is a side elevation of a side-seated seat, showing a leg restraint device according to a preferred embodiment of the invention in its deployed position.

As shown in FIGS. 3 and 4, the restraint panel 24 deploys to a position forward of the seat 10 immediately adjacent the forward lower leg of the passenger in relation to the traveling direction of the aircraft. In the deployed position, the panel 24 prevents lower leg flails, i.e., movement of the lower leg along the traveling direction of the vehicle. In the event of abrupt deceleration sufficient to trigger restraint panel deployment, the forward leg, and consequently the other leg through contact with the forward leg, is restrained by the panel 24 against injury causing forward movement. As described in further detail below, an actuator associated with the panel 24 functions to automatically deploy the panel 24 during an event sufficient to trigger deployment. Suitable actuators may include, but are not limited to, an air bag, pusher, piston, gas cylinder and rod, and like linear actuator for triggering instantaneous panel deployment. Upon the occurrence of an event requiring side restraint protection of the seat occupant, the actuator is triggered to force the restraint panel 24 rapidly from beneath the seat 10 and into a protective position.

Referring to FIGS. 1-9, in a first embodiment an air bag 26 serves as the actuator. The air bag 26 may inflate in two-stages or phases, in which a first phase inflates the air bag to deploy the restraint panel 24 from beneath the seat 10 to the forward position, and in a second phase the air bag 26 continues inflating and projects outwardly along the side of the deployed restraint panel 24 nearest the seat occupant's foot and lower leg, i.e., in a direction away from a face of the restraint panel 24. In this configuration, best shown in FIGS. 3 and 4, the air bag 26 provides an air cushion for the seat occupant's foot and lower leg that prevents direct contact with the inner face of the rigid restraint panel 24. Note that in the fully deployed configuration, the air bag 26 may extend beyond the fully deployed position of the cap plate 28 of the restraint panel 24 in order to fully protect the seat occupant's foot and lower leg.

The restraint panel 24 may be configured to automatically retract after the deceleration event is over. In the case of an air bag actuator, deflation of the air bag 26 may cause the restraint panel 24 to retract back into its respective housing 22. Retraction may occur rapidly to remove tripping hazards and clear the area around the seat 10 for rapid, unrestricted egress by both the seat occupant and other aircraft occupants who may have to move past the seat 10 in order to egress from the aircraft.

Figure 5:
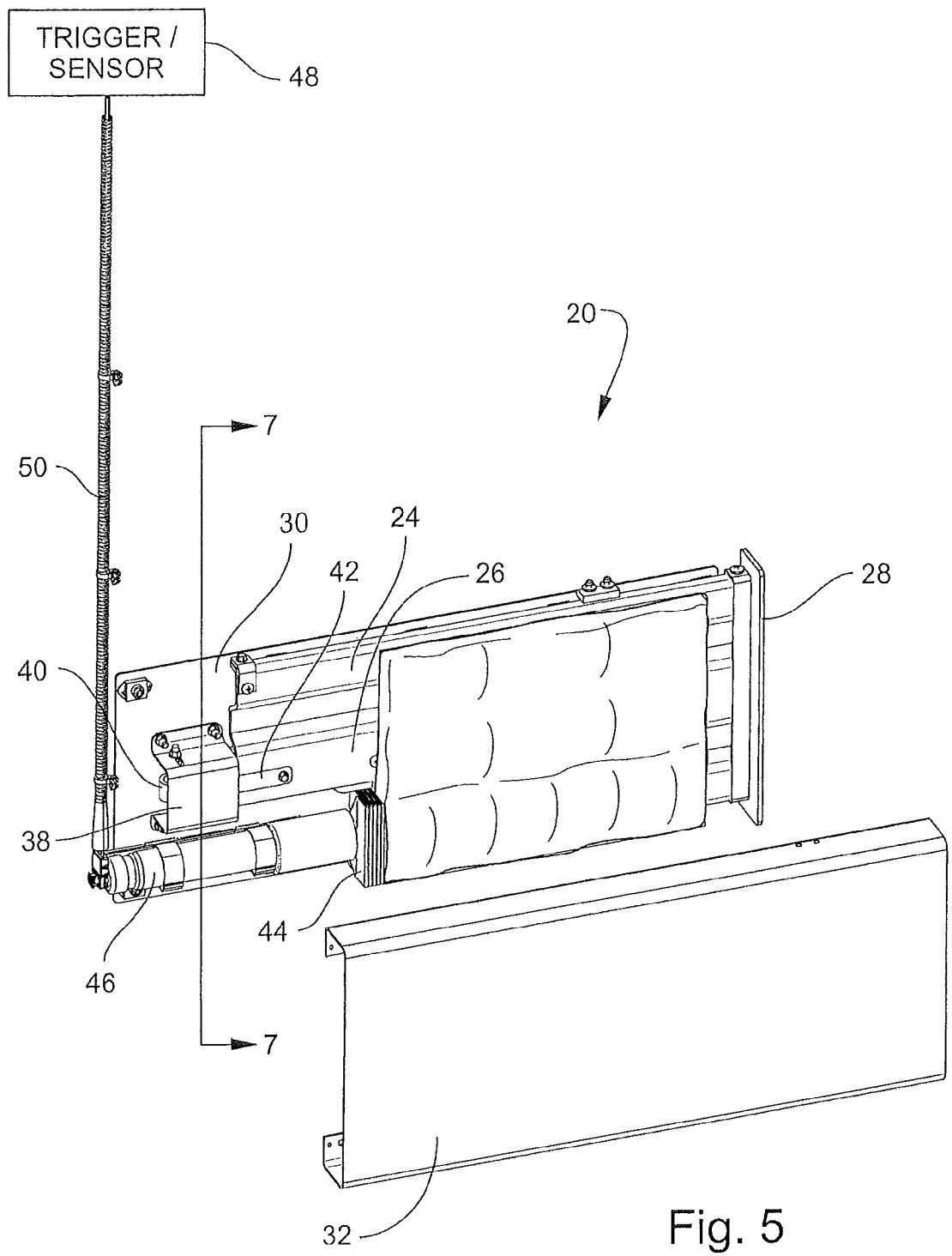
FIG. 5 is a partially-exploded view of one embodiment of the invention showing the air bag in its stowed, retracted position.
Figure 6:
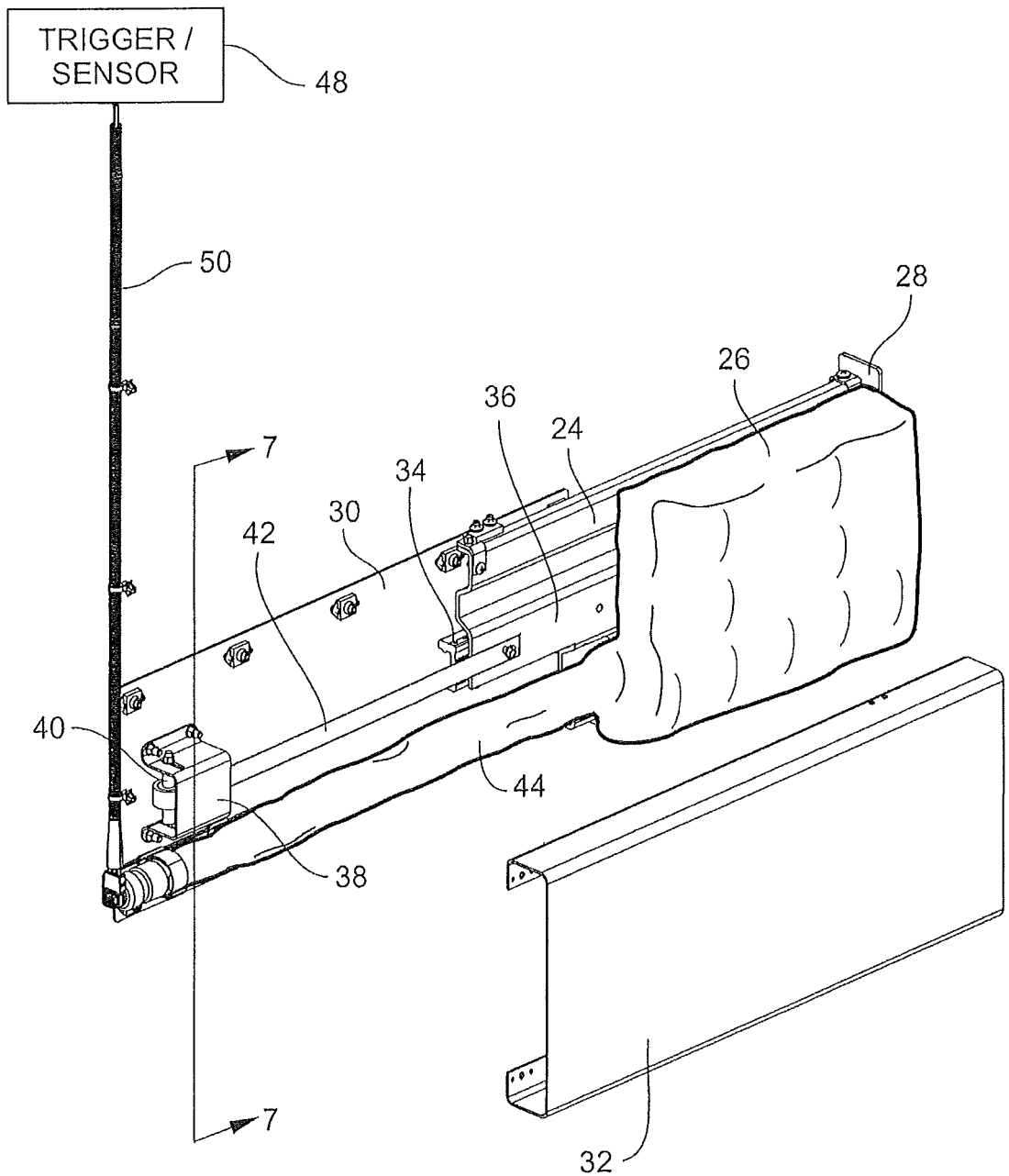
FIG. 6 is a partially-exploded view of one embodiment of the invention showing the air bag in its fully deployed position.
Figure 7:
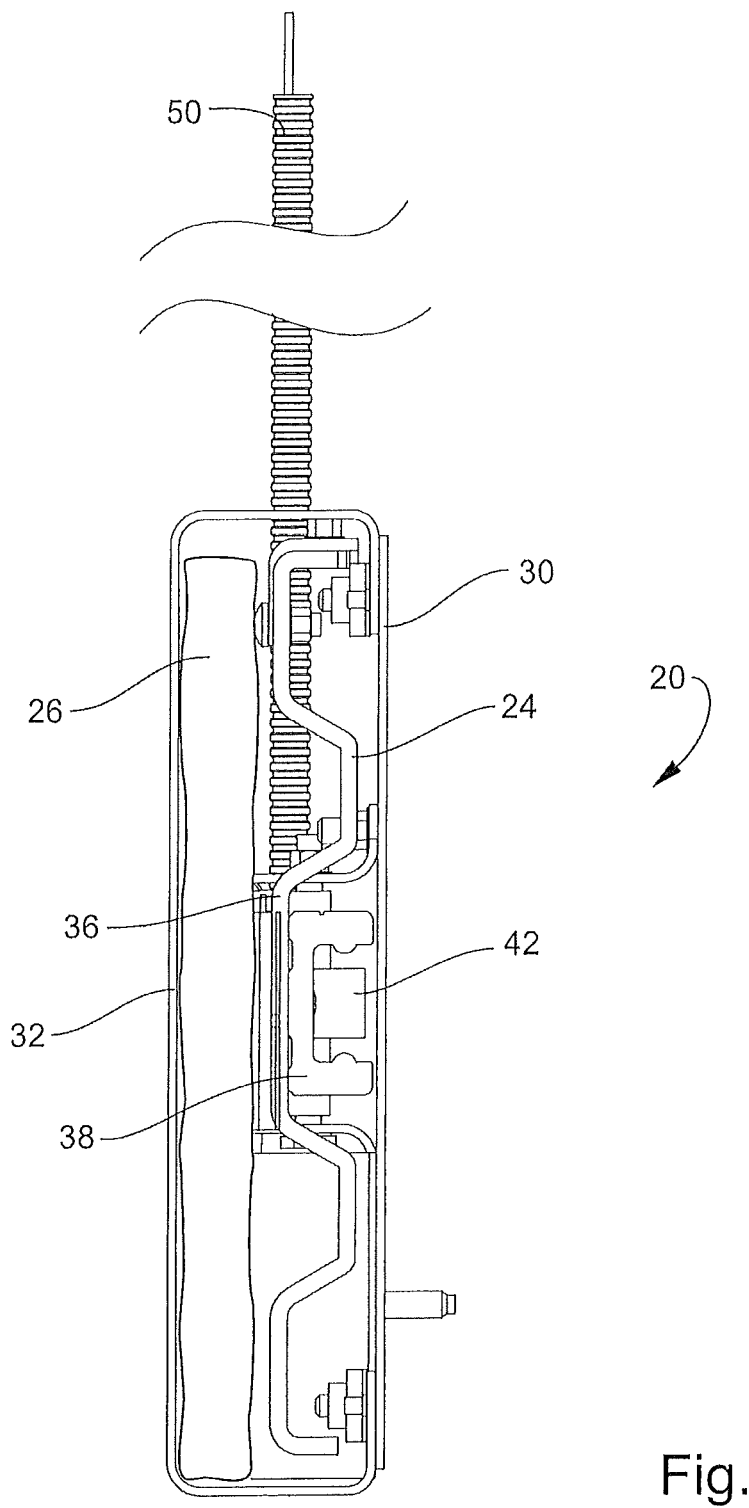
FIG. 7 is a vertical cross-section taken along line 7-7 of FIG. 5.
Figure 8:
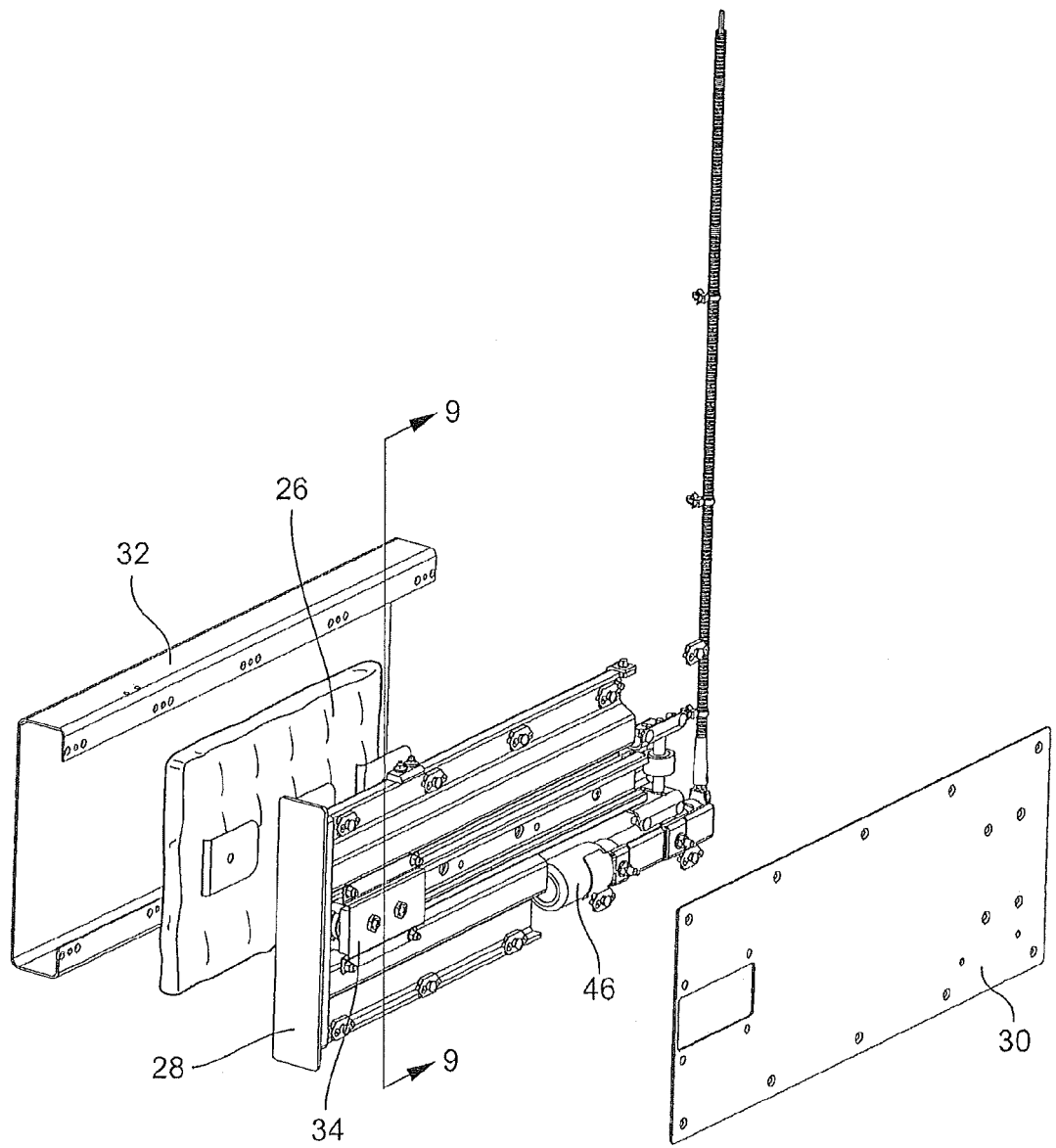
FIG. 8 is an exploded view of one embodiment of the invention from a side opposite FIGS. 5 and 6.
Figure 9:
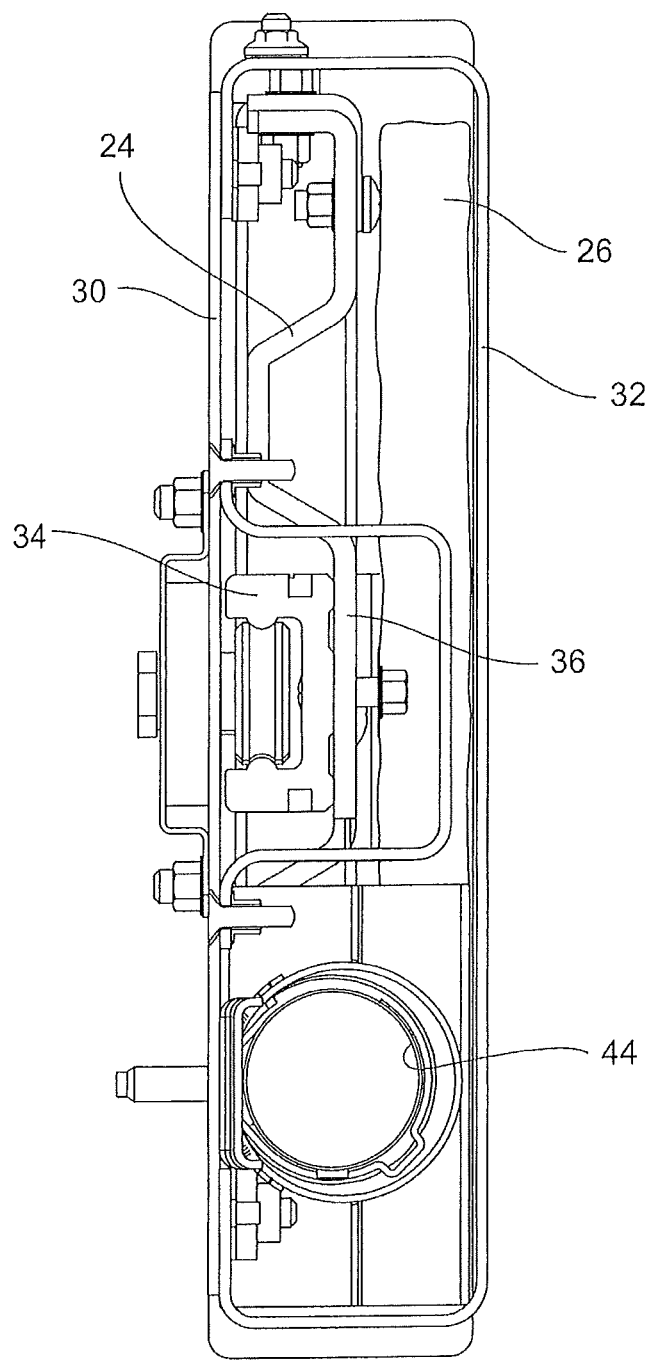
FIG. 9 is a vertical cross-section taken along line 9-9 of FIG. 8.
Figure 10:
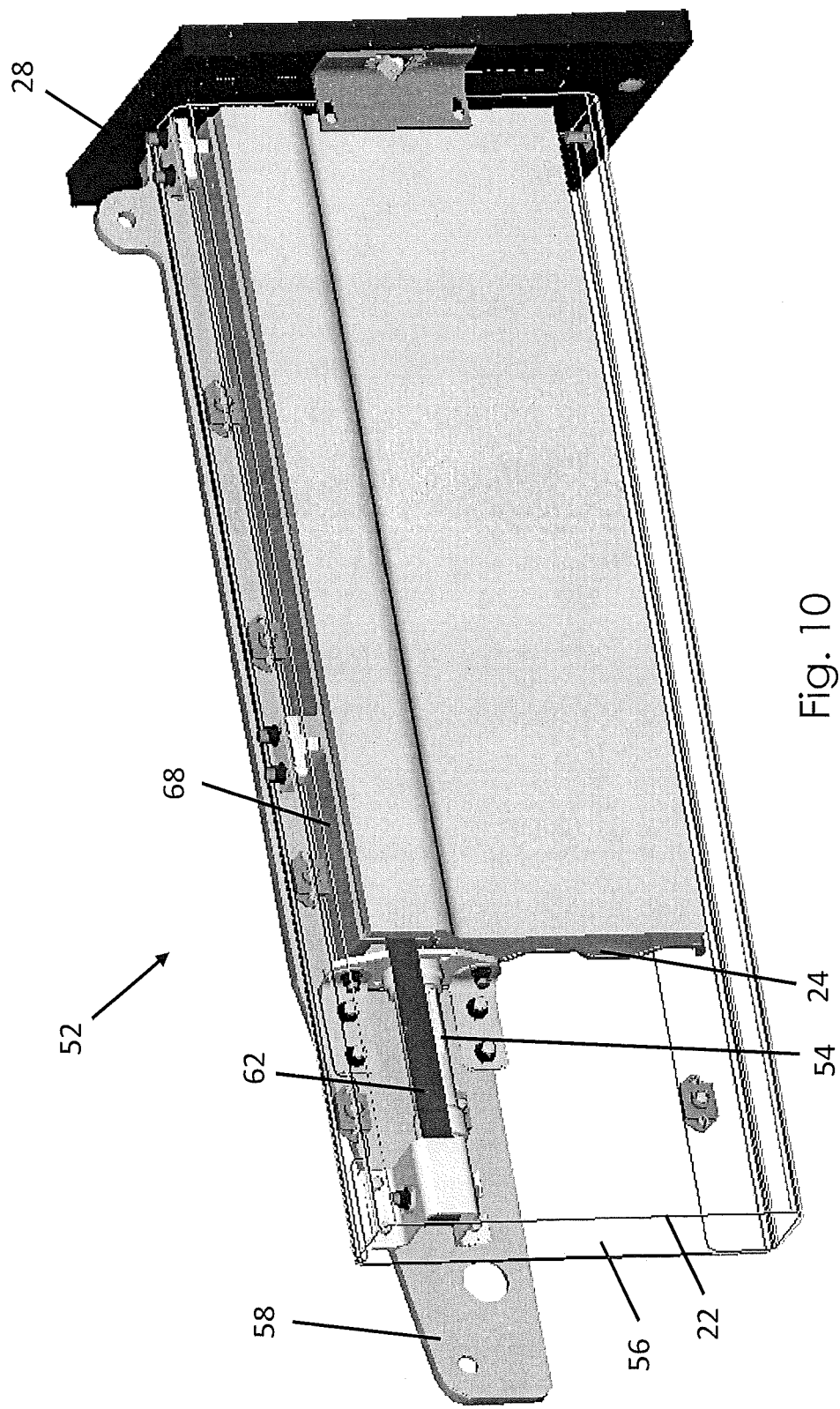
FIG. 10 is a perspective view if another embodiment of a leg restraint device including a gas piston actuator.

Referring now to FIGS. 4-9, the housing 22 of the restraint device 20 is formed from two stationary housing covers 30, 32. The restraint panel 24 and the cap plate 28 slide in and out of the retracted and deployed positions on a wheeled guide shuttle 34 mounted on the inner surface of housing cover 32. As shown in FIGS. 7 and 9, the restraint panel 24 has a "corrugated" cross-section to provide the necessary spacing for the movable components. The guide shuttle 34 is captured in and rides along a central, longitudinally-extending recess 36 in the restraint panel 24.

The restraint panel 24 is attached to a retractor that includes a spring housing 38 mounted on the cover 30. A vertical pin 40 mounts a coiled steel spring 42 that is mounted on the restraint panel 24 and biased towards its retracted position. See FIG. 5. Activation of the air bag 26 overcomes the bias of the spring 42 during inflation, allowing the restraint panel 24 to deploy, as shown in FIG. 6. As inflation ends and deflation begins, the spring 42 causes the restraint panel 24 to immediately retract so that, as described above, the restraint panel 24 does not project into the aircraft aisle impeding egress from the aircraft.

The air bag 26 is mounted on and extends along the length of the restraint panel 24. As is shown in FIG. 5, the air bag 26, before deployment, resides in a deflated configuration against the restraint panel 24. The air bag 26 includes a tubular neck 44 that is attached to an inflator 46 mounted on the cover 32. In the deflated configuration, the neck 44 is folded in an accordion manner between the inflator 46 and the air bag 26. The term "air bag" is generally used to describe this device even though gases other than "air" cause the bag to inflate. The inflator 46 may be a cold gas inflator, a hybrid inflator, or a pyrotechnic inflator depending on the design factors of the device. Speed, deployment time, gas temperature, etc. can all dictate the type of inflator 46 utilized to achieve the desired operation and may be the subject of varying legal and technical requirements.

The inflator 46 may be triggered by a trigger/sensor 48 that is also used to activate the seat belt air bag 18, see FIG. 6, or by a trigger/sensor that functions only to inflate the air bag 26. As shown in FIGS. 5 and 6, the trigger/sensor 48 communicates with the inflator 46 through a shielded conduit 50. As shown in FIG. 6, inflation of the air bag 26 causes the neck 44 to first inflate as gas passes from the inflator 46 to the air bag 26. This inflation causes the neck 44 to unfold and straighten, driving the air bag 28 and the restraint panel 24 on which it is mounted rapidly forward out of the housing 22 and into the aisle of the aircraft, as shown in FIGS. 3 and 4. Typically, the air bag 26 is fully inflated within approximately 60-80 milliseconds, and vents in the air bag 26 allow the gas to escape, very rapidly deflating the air bag 26. The spring 42 rapidly returns the restraint panel 24 and air bag 26 to the position shown in FIG. 5, as described above.

Referring to FIGS. 10-14, a lower leg restraint device according to a second embodiment of the invention is shown generally at reference numeral 52. Like device 20, device 52 generally includes a housing 22 positioned below the seat bottom, a restraint panel 24 deployable from a first position proximate a seat (e.g., under the seat pan) to a second position forward of the seat, and a decorative cap plate 28 covering a forward end of the restraint panel 24. Instead of an inflatable air bag, device 52 utilizes a pusher 54 to push the panel into the path of the occupant's leg movement. As used herein, the term "pusher" includes, but is not limited to, a hood-popper, gas piston, linear actuator, etc. configured to rapidly extend the restraint panel 24. In a preferred embodiment, the pusher 54 includes a piston 66 configured to rapidly extend by activation of a micro gas generator for generating a volume of gas nearly instantaneously by the rapid ignition of chemicals.

Figure 11:
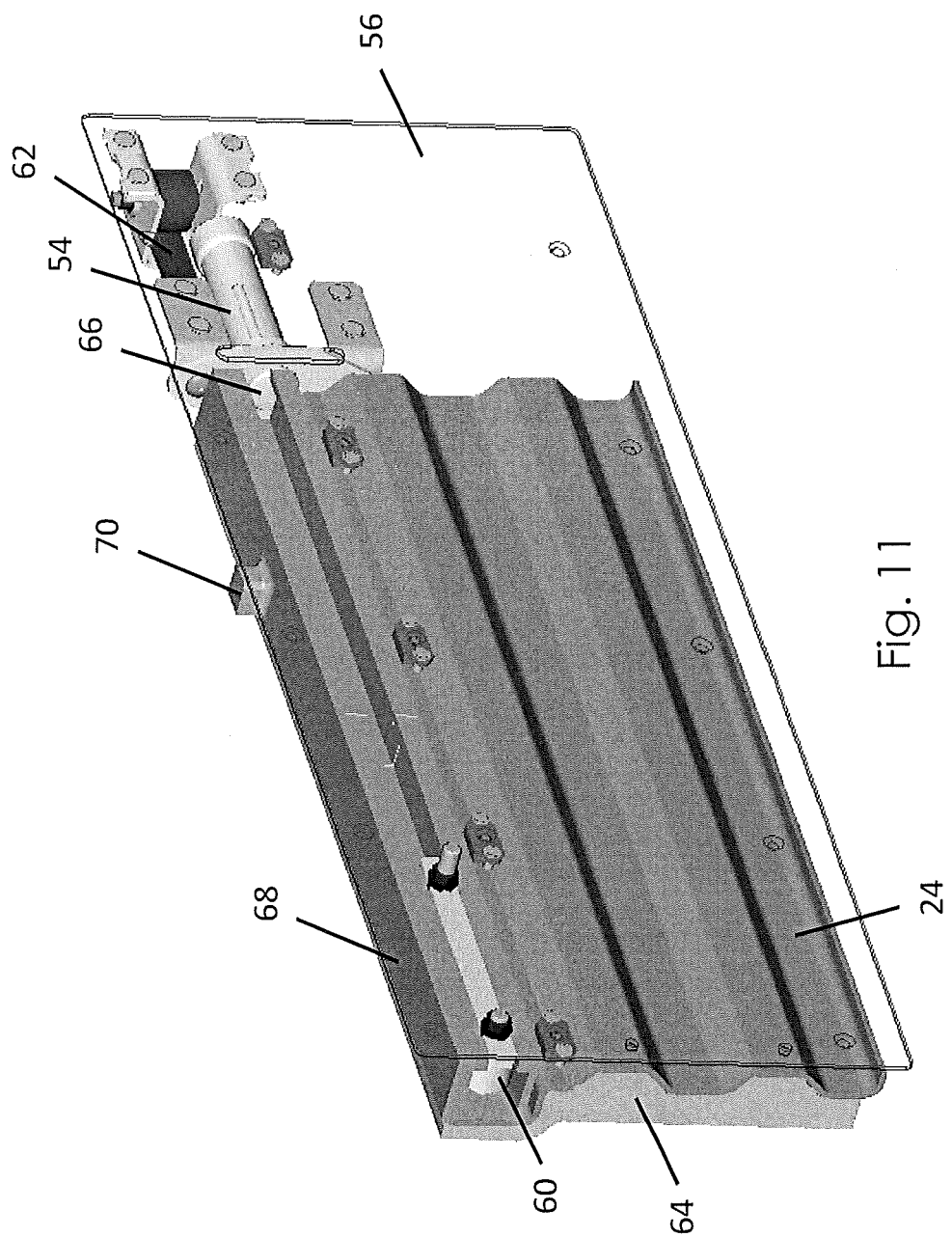
FIG. 11 is a perspective view of the leg restraint device of FIG. 10 from a side opposite thereof and with the housing in transparency for clarity.
Figure 12:
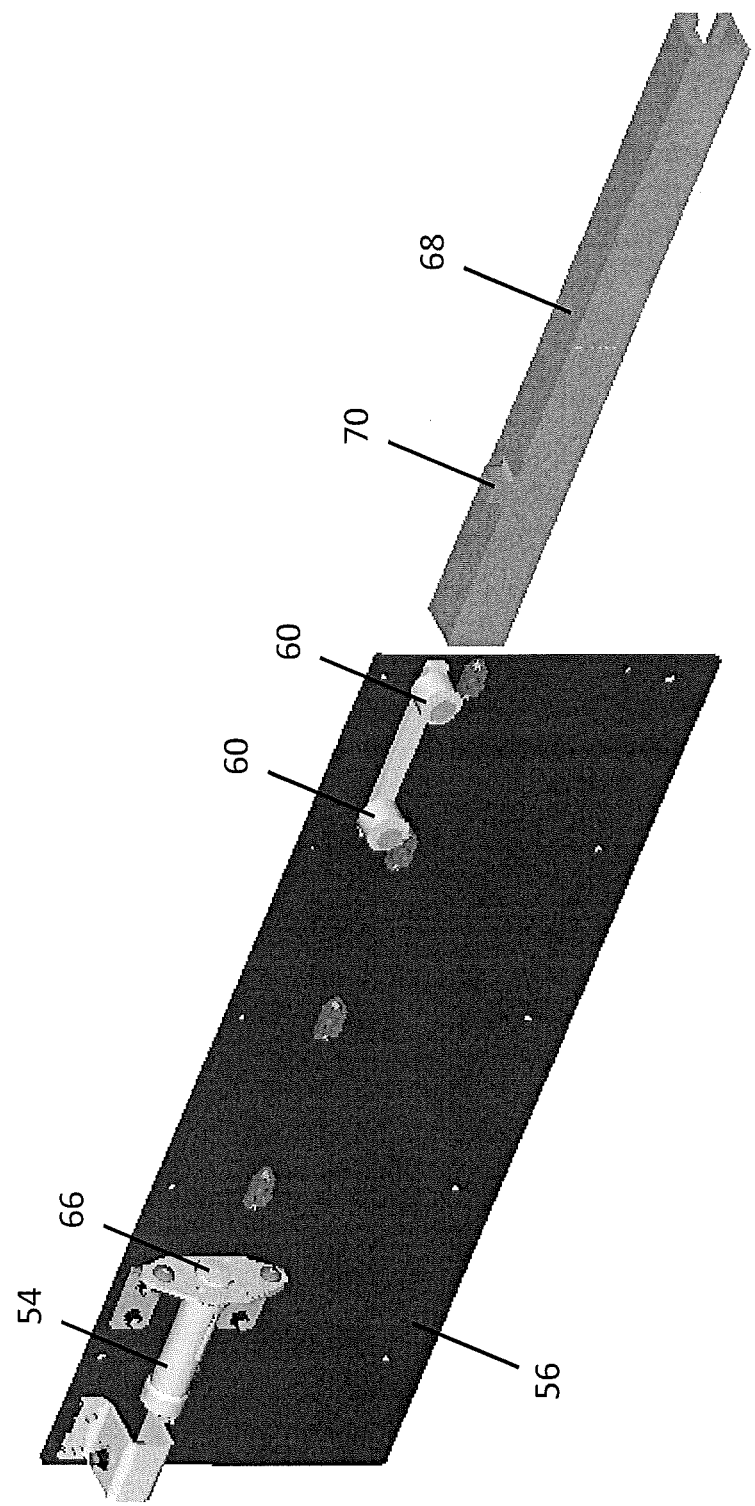
FIG. 12 is an isolated view of the mounting plate, linear slide and gas piton actuator of the device of FIG. 10.
Figure 13:
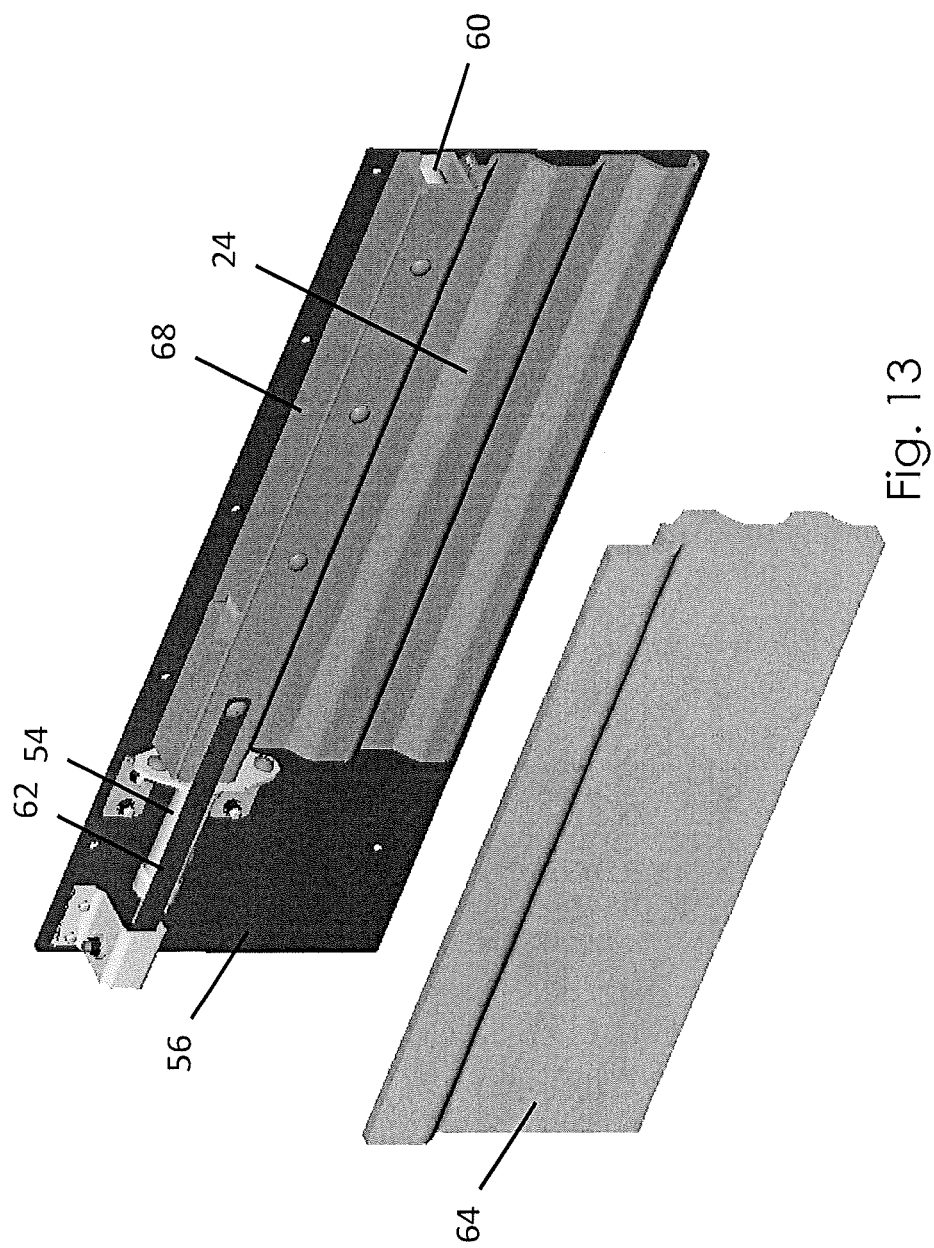
FIG. 13 is an exploded view of the device of FIG. 10 showing a cushion removed from the panel.
Figure 14:
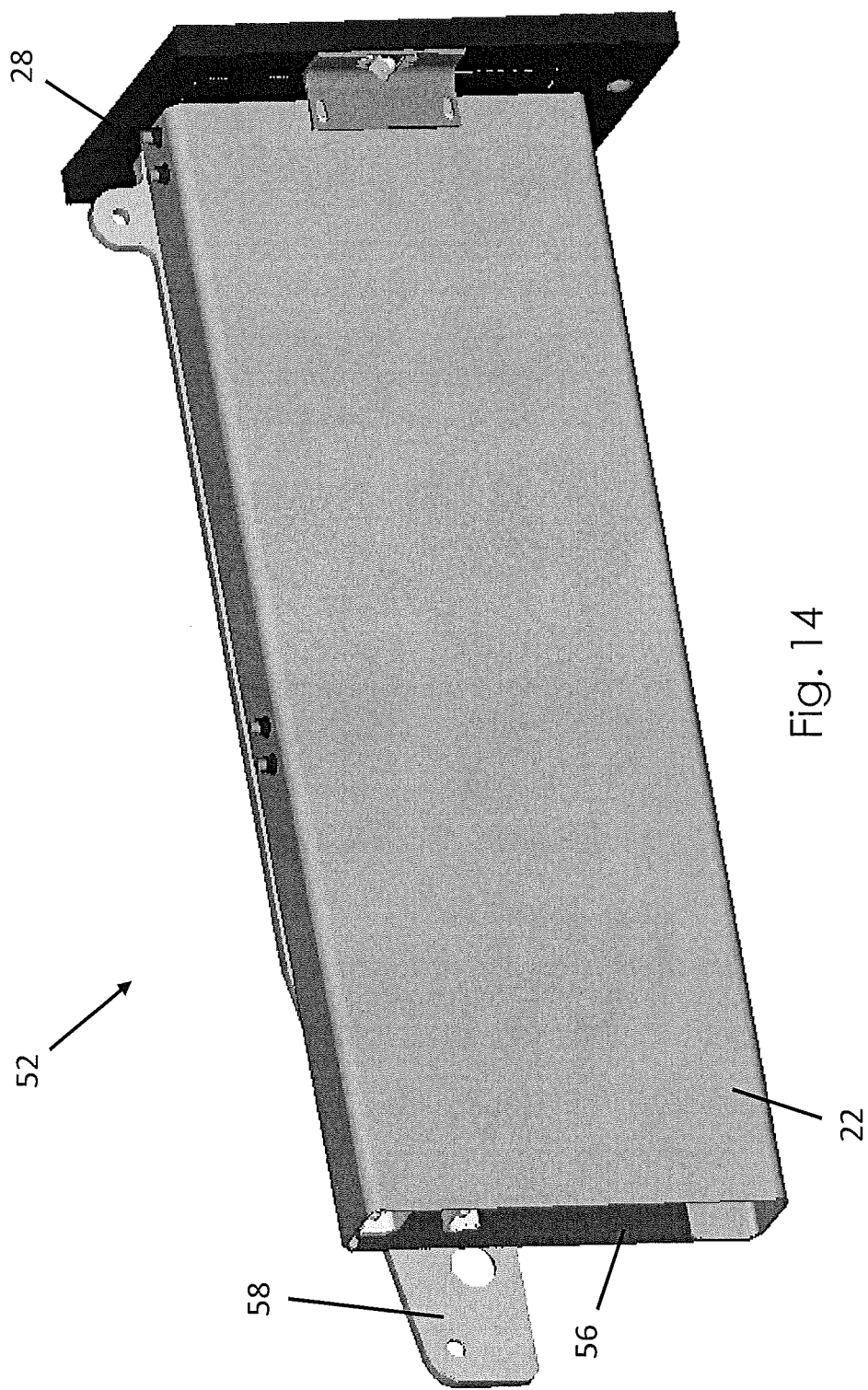
FIG. 14 is a perspective view of the device of FIG. 10 showing the housing.

As best shown in FIGS. 11-13, the pusher 54 is secured to a face of a vertically-oriented mounting plate 56 outboard of the restraint panel 24. The mounting plate 56 may be one piece of the two-piece housing 22. The opposite face of the mounting plate 56 is secured against an elongate frame member 58, which may be a horizontal frame member of the seat or divan. The mounting plate 56 is fixed such that the restraint panel 24 translates relative thereto during deployment and retraction. Horizontally-oriented bearings 60 are mounted on the same side of the mounting plate as the pusher 54, and are spaced therefrom in order to support, guide and facilitate linear motion of an elongate carriage 68 carrying the restraint panel 24. As shown, the restraint panel 24 attaches to the carriage 68 along the top edge thereof such that the restraint panel 24 hangs down from the carriage 68.

The pusher 54 is oriented horizontally such that the piston 66 aligns with one end of the carriage 68. In this arrangement, horizontal movement of the firing piston 66 pushes against the carriage 68 to deploy the restraint panel 24 forward of the seat. Forward movement of the restraint panel 24 may be stopped by way of a mechanical stop, such as the protruding mechanical stop 70 on the top of the carriage 68 positioned to contact the housing, seat frame member or other interfering structure positioned to contact the mechanical stop to limit the forward travel of the restraint panel 24.

A return spring 62, or like biasing device, anchored at one end proximate the pusher 54 returns the carriage 68 and restraint panel 24 to the stowed position after the deceleration event to free the egress pathway. The other end of the return spring 62 may be attached to one of the carriage or restraint panel 24. The return spring 62 biases the carriage in the direction of the stowed position under the seat, and the pusher 54 has sufficient power when actuated to overcome the force of the return spring 62 to permit deployment. Foam, padding or other cushioning material, shown generally at reference numeral 64, is attached to the inboard face of the restraint panel 24 to cushion impact and prevent direct contact of the lower leg, foot or ankle with the rigid restraint panel 24. As described above, the restraint panel 24 may have a corrugated profile for strength and to incorporate the linear slide and return spring 62 in a compact package.

As described above in the first embodiment, a "fire" signal from a crash sensor and trigger assembly causes the pusher 54 to fire in response to a deceleration event of a sufficient magnitude to trigger restraint panel deployment. In a specific embodiment, the pusher 54 may be a hood-popper of the type known in the automobile industry for raising a hood during a pedestrian collision to absorb collision forces and reduce injury. One example of such a hood-popper is available from Takata Protection Systems of Pompano Beach, Fla.

While leg restraint devices for side-seated vehicle occupants according to the invention have been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

What is claimed is:

1. A lower leg restraint for a side-facing passenger seat, comprising:
   (a) a restraint panel configured to deploy from a first position proximate a seat to a second position forward of the seat in response to an abrupt deceleration event;
   (b) an actuator arranged to push the panel from the first position to the second position, the actuator comprising a pusher including a piston configured to rapidly extend;
   (c) a sliding carriage, wherein the restraint panel is attached to the sliding carriage with one end of the sliding carriage arranged facing the piston such that piston extension pushes the sliding carriage away from the pusher in a direction of the second position; and
   (d) a sensor and trigger assembly configured to signal the actuator to fire in response to the abrupt deceleration event.

2. The lower leg restraint of claim 1, wherein the pusher is attached to one face of a fixed mounting plate further supporting at least one horizontally-oriented bearing spaced from the pusher for guiding linear movement of the sliding carriage, the restraint panel translating relative to the fixed mounting plate as the restraint panel moves between the first and second positions.

3. The lower leg restraint of claim 1, further comprising a return spring arranged to return the restraint panel to the first position after the abrupt deceleration event, one end of the return spring attached to a fixed member and an opposite end of the return spring attached to one of the sliding carriage and the restraint panel.

4. The lower leg restraint of claim 1, wherein the restraint panel deploys from within a housing adapted to be positioned under the seat.

5. The lower leg restraint of claim 1, wherein the restraint panel deploys horizontally.

6. The lower leg restraint of claim 1, further comprising a cushion attached to an inboard face of the restraint panel.

7. The lower leg restraint of claim 1, wherein the restraint panel has a corrugated profile and a vertical dimension spanning between a floor supporting the seat and a seat pan of the seat.

8. The lower leg restraint of claim 1, further comprising a decorative end plate attached to a forward end of the restraint panel.

9. A side-facing aircraft passenger seat having a deployable lower leg restraint, comprising:
   (a) a seat bottom;
   (b) a seat back
   (c) a restraint panel configured to deploy from a first position under the seat bottom to a second position forward of the seat bottom in response to an abrupt deceleration event;
   (d) an actuator comprising a pusher including a piston which extends to push the panel from the first position to the second position;
   (e) a sensor and trigger assembly configured to signal the actuator to fire in response to the abrupt deceleration event; and
   (f) a sliding carriage, wherein the restraint panel is attached to the sliding carriage with one end of the sliding carriage arranged facing the piston such that piston extension pushes the sliding carriage away from the pusher in a direction of the second position.

10. The seat of claim 9, wherein the pusher is attached to one face of a fixed mounting plate further supporting at least one horizontally-oriented bearing spaced from the pusher for guiding linear movement of the sliding carriage, the restraint panel translating relative to the fixed mounting plate as the restraint panel moves between the first and second positions.

11. The seat of claim 9, further comprising a return spring arranged to return the restraint panel to the first position after the abrupt deceleration event, one end of the return spring attached to a fixed member and an opposite end of the return spring attached to one of the sliding carriage and the restraint panel.

12. The seat of claim 9, wherein the restraint panel deploys horizontally from within a housing positioned below the seat bottom.

13. The seat of claim 9, further comprising a cushion attached to an inboard face of the restraint panel.

14. The seat of claim 9, wherein the restraint panel has a corrugated profile and a vertical dimension spanning between the seat bottom and underlying floor.

15. The seat of claim 9, further comprising a decorative end plate attached to a forward end of the restraint panel.

* * * * *